Dec. 17, 1935.  R. C. GEIGER  2,024,282
FOOD HANDLING APPARATUS
Filed July 31, 1931  5 Sheets-Sheet 1

INVENTOR
Russell C. Geiger
BY Maréchal & Noe
ATTORNEYS

Dec. 17, 1935.  R. C. GEIGER  2,024,282
FOOD HANDLING APPARATUS
Filed July 31, 1931   5 Sheets-Sheet 2

INVENTOR
Russell C. Geiger
BY Marechal & Noe
ATTORNEYS

Dec. 17, 1935.  R. C. GEIGER  2,024,282

FOOD HANDLING APPARATUS

Filed July 31, 1931    5 Sheets-Sheet 4

INVENTOR
Russell C. Geiger
BY Maréchal & Noe
ATTORNEYS

Patented Dec. 17, 1935

2,024,282

UNITED STATES PATENT OFFICE 2,024,282

FOOD HANDLING APPARATUS

Russell C. Geiger, Troy, Ohio, assignor to The Kitchen Aid Manufacturing Company, Troy, Ohio, a corporation of Ohio Application July 31, 1931, Serial No. 554,255

8 Claims. (Cl. 259—102)

This invention relates to food handling and preparing apparatus and more particularly to machines for mixing, beating and stirring foodstuffs and for general utility work about the kitchen.

It is an object of this invention to provide a food handling apparatus having an electric drive and a variable speed transmission, which is simple and compact in construction, highly effective and well balanced in operation, attractive in appearance, light in weight, and requiring a minimum amount of space.

It is a further object to provide a change speed transmission and control therefor which are compact, provide for easy manipulation, afford quiet operation, and are effectively enclosed.

It is a further object to provide such a machine with an effective bowl support and with simple and effective bowl raising and lowering mechanism.

Other objects and advantages will be apparent from a study of the detailed description, the accompanying drawings, and the appended claims.

In the drawings—

Figure 1:
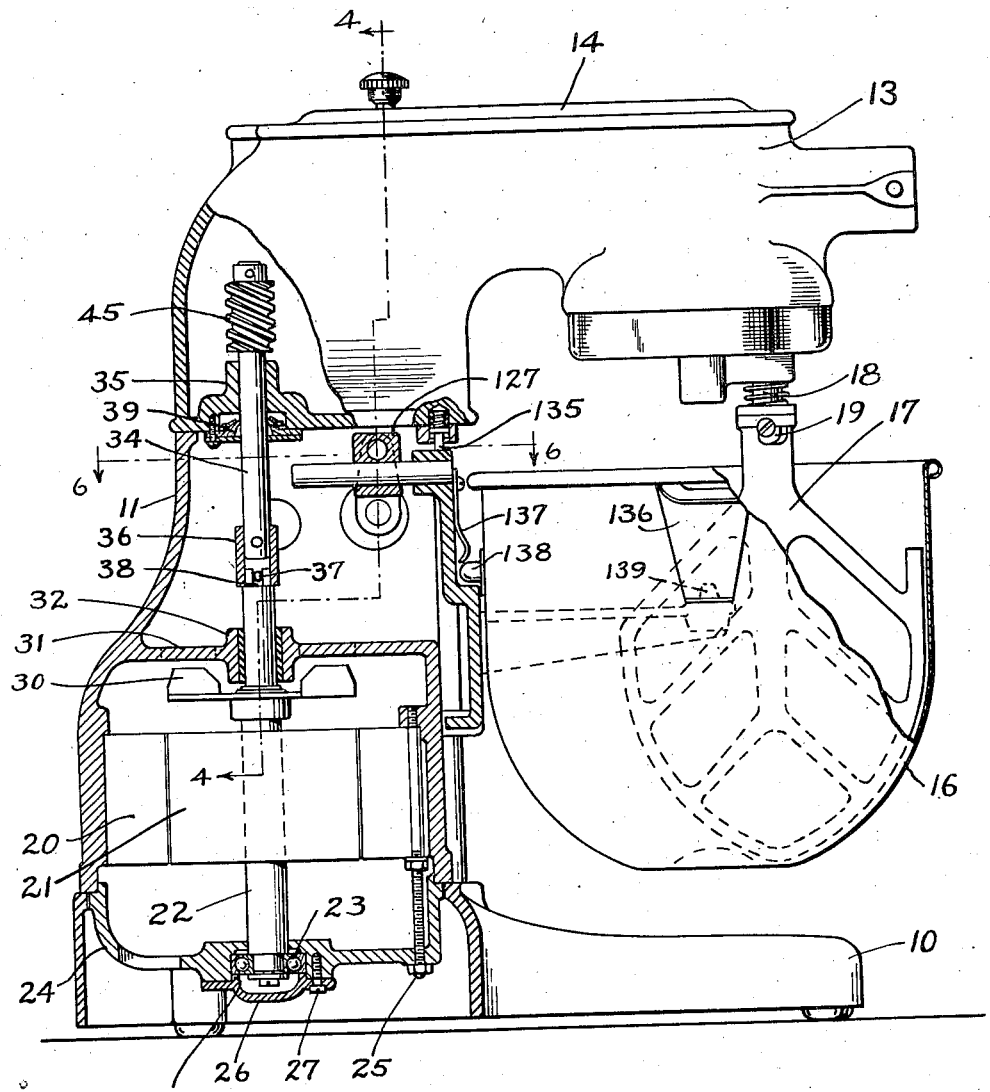
Fig. 1 is a side elevational view with a portion broken away and in section of a food handling apparatus constructed in accordance with the present invention.

Reference is herein made to the copending application of Herbert L. Johnston and David A. Meeker, Serial No. 277,616, filed May 14, 1928, for Food-handling apparatus, which discloses and claims apparatus of this general nature.

Referring to the drawings, wherein there is illustrated a preferred embodiment of the invention, there is shown a base 10 upon which is mounted an upstanding pedestal 11. Fastened to the pedestal by bolts 12 is a housing 13 which is extended beyond the pedestal and overhangs the base. The housing is open on top and a removable cover plate 14 is bolted thereto in a suitable manner as, for instance, by bolts 15. A bowl 16 is adjustably supported from the pedestal and cooperates with a beating element 17 which is mounted upon a planetary shaft 18 through a bayonet connection 19. Shaft 18 is driven by a motor through suitable speed reducing and change speed gearing to cause the beater element to act upon material placed within the bowl.

Within the lower portion of the pedestal is mounted a motor comprising a stator 20 and a rotor 21. The rotor shaft 22 is substantially vertical and is supported at its lower end in a bearing 23 formed in the end cap 24. Suitable bolts 25 extending into the pedestal support the stator within the pedestal and likewise removably support the end cap 24, the pedestal forming a housing for the motor parts. A cover plate 26 is bolted to the end cap by means of bolts 27 and is also formed with a flange 28 for retaining the bearing 23 in its seat. The base is open at this point and is of greater diameter than any of the motor parts so that access may be freely obtained to the motor. By removing plate 26 the lower bearing may be withdrawn and if it is desired to remove the whole motor, it is only necessary to remove the several bolts 25 and then the end cap, rotor and stator are removable. A suitable switch 29 is mounted in the base for controlling the motor circuit.

The motor shaft extends upwardly and a suitable fan 30 may be mounted thereon. A web 31 is formed in the pedestal and a bearing 32 positioned therein for journaling the upper end of the shaft. The lower bearing 23 may conveniently serve as a thrust bearing to support the weight of the rotor and shaft.

A driven shaft 34 is mounted within a bearing 35 formed adjacent the lower portion of the top housing member 13 and is positioned in vertical alignment with the motor shaft 22. In order to make allowance for inequality and irregularities in the aligned shaft a pin and slot connection is provided between the two shafts in the form of a sleeve 36 pinned to the driven shaft, a pin 37 positioned in the sleeve and engaging a cooperating slot 38 in the upper end of the motor shaft. In this way, slight variations in the two shafts will not cause excessive wear. A sealing washer 39 of any suitable conventional form is attached to the lower end of bearing 35 to prevent leakage of lubricant from the upper housing into the upper portion of the pedestal 11 or into the motor, while at the same time bearing 35 is assured of adequate lubrication.

A worm 45 is provided adjacent the upper extremity of shaft 34 and engages a worm gear 46 which is mounted upon a counter shaft 47 supported in bearings 48 formed in the housing. The counter shaft also carries two spur gears 50 and 51 each fastened to the shaft.

The change speed transmission preferably takes the form of a tumbler gear mechanism. The tumbler gears are carried by a rocking frame mounted upon a main driven shaft 60 which extends longitudinally through the upper housing 13 and is journaled therein in a centrally located bearing 61. This shaft and the motor shaft lie in a common vertical plane located substantially centrally of the food handling apparatus. The tumbler gear mechanism comprises a cage or rocking frame 62 within which rotates a gear 63, this gear being splined on the main driven shaft 60, and the cage being free to move on the shaft, both rotatably and axially. The cage also rotatably supports two driving pinions 64 and 65 of different diameters, which are fastened to the same shaft 66, the smaller pinion 64 being constantly in engagement with gear 63. As illustrated, the pinion 65 is in driving engagement with gear 51 so that power is transmitted from the motor through the worm 45 and worm gear 46 to counter shaft 47, gear 51, pinion 65, shaft 66, pinion 64 and gear 63 to the main driven shaft 60. It will be understood that a change in the driving connection is brought about by swinging the tumbler mechanism about shaft 60 and adjusting it axially thereof to cause pinion 65 to engage gear 50 for a higher speed drive, or to cause pinion 64 to engage gear 50 for a still higher speed ratio.

Figure 2:
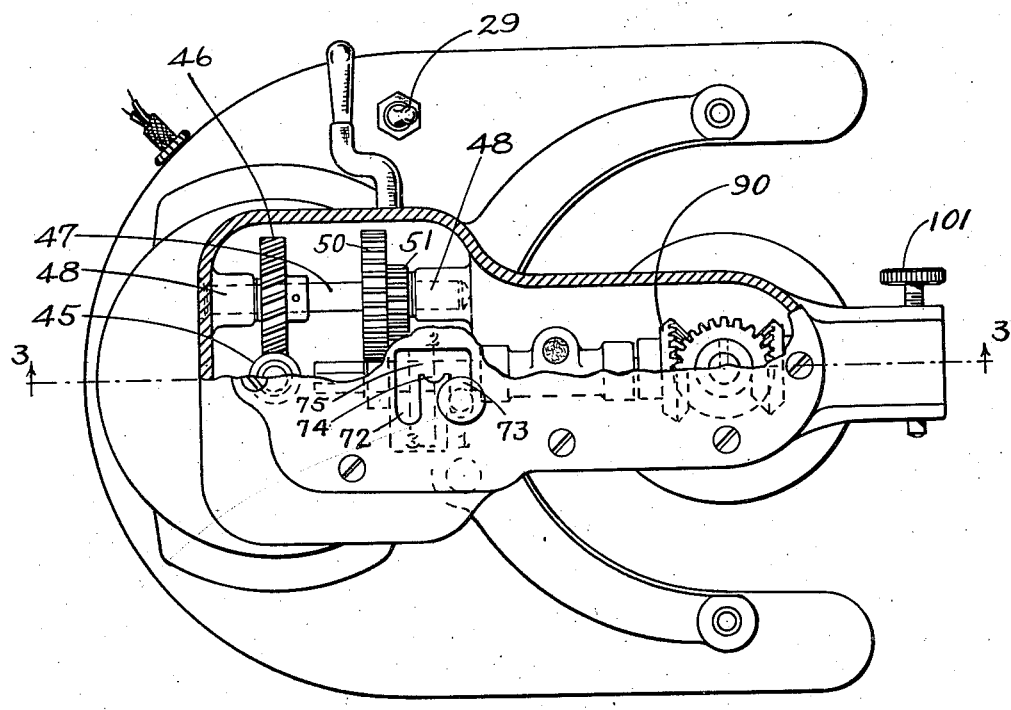
Fig. 2 is a plan view of the machine with a portion of the cover plate broken away.

A handle 70 is positioned on the cage of the tumbler mechanism and extends through a slot 71 formed in the top cover plate 14. This slot is formed as indicated in Fig. 2 and comprises two long legs 72 and 73 and a short leg 74, all joined together by a passage 75. A spring 76, attached at one end to the cage above the shaft 60 and at its other end to the housing, normally urges the cage about shaft 60 in such a direction that gears 64 and 65 carried by the cage are urged toward intermeshing position with gears 50 and 51. The same action causes handle 70 to be urged toward the extremities of slots 72, 73, and 74. The diameter of the shaft supporting the handle is such that it fits closely within the slots but without binding. In order to change the driving connection from that shown, the handle 70 is moved by the operator against the action of the spring out of slot 73, which motion causes a swinging of cage 62 about shaft 60 and consequently the disengagement of pinion 65 from gear 51, thus moving the parts out of low speed. Then the handle is given a movement at right angles to its first movement which causes an axial slide of the cage along shaft 60. The handle may here be dropped either into the shorter leg 74 which then will cause the intermeshing of pinion 65 with gear 50 to provide an intermediate speed, or it may be given a further axial movement and dropped into slot 72 to cause the engagement of pinion 64 with gear 50 to provide high speed.

A projecting pin 77 is positioned on the cage within the housing and projects through a slot in a plate 78 fastened to the interior of the housing wall. This plate has slots 79, 80, and 81 formed therein, corresponding to the three positions of the tumbler mechanism. Individually adjustable stops in the form of bolts 82, 83, and 84 are positioned with their ends extending respectively into the slots 79, 80, and 81. These bolts are of varying length to provide for limiting the travel of the cage to the proper distance as it is moved to one or the other of its several operating positions and resiliently held in such position by spring 76. These bolts terminate directly below the cover plate 14 and consequently are accessible when the cover plate is removed. A curved strip of spring metal 88 is mounted so as to resiliently engage each of the bolts 82, 83, and 84 to provide means for locking the bolts in adjusted position. This provides in effect a single automatic locking member for all the stops, which gives resiliently when any one of the bolts is turned by the application of pressure as by a screw driver to permit adjustment thereof without disassembly or loosening of any of the other parts, and which at the termination of the adjustment automatically locks the adjusted part in its new position. Spring 76 urges the pinions of the tumbler gear mechanism into engagement with gears 50 and 51 and the individually adjustable stops provide independent adjustment of the depth of mesh of the gears in each of the three speeds, whereby quiet and efficient operation of the gearing is attained. A sliding sealing plate 85 is carried by the handle 70 and is pressed upwardly against the inner surface of the housing by a spring 86. This plate is of sufficient width and length to close the slot 71 in the cover during the shifting of the change speed mechanism and in all operating positions of the shifting lever and tumbler gear frame. A sealing washer 87 may be fastened to the under side of the cover 14 about the opening 71, the plate 85 bearing against this washer.

Mounted upon the extended end of the driven shaft 60 is a beveled gear 90 which is in driving engagement with a beveled gear 91. Gear 91 is fastened to a vertical shaft 92 which is journaled in a bearing member 93. This bearing member is provided with screw threads at its lower portion and a nut 94 is positioned thereon and draws the bearing tightly against a hub 95 formed in the housing. A third beveled gear 96 is in mesh with gear 91 and has an extended shaft portion 97 which is supported within an outwardly extending hollow portion 98 of the housing. The extension 98 is provided with an outwardly flaring taper 99 and the shaft 97 has an internal bore throughout a portion of its length which is squared as indicated at 100 to provide a driving connection for an attachment. Thumb screw 101 is provided in the tapered portion, adapted to fasten the attachment and hold it while it is operated by shaft 97. The attachment may be for instance a chopper, a slicer, an ice cream freezer, or any other form of household appliance which may be advantageously driven through the motor and transmission gearing of this machine, it being understood that the attachment is provided with a cooperating tapering support and a driven shaft having a squared end adapted to fit within socket 100.

A planetary head 105 is fastened to shaft 92 adjacent its lower extremity. This head is provided at one side with a journal 106 which rotatably supports the beater shaft 18. A small pinion 108 is fastened to shaft 18, the gear resting on the head 105 which thus serves to take the thrust of the shaft and support the same.

An internal ring gear 110 is removably mounted on an annular extended web 111 of the housing 13 by means of bolts 112. Pinion 108 is adapted to engage ring gear 110. This is a conventional arrangement now well known in food handling apparatus providing for a rotating motion of shaft 18 about its own axis compounded with a second rotary motion about the axis of shaft 92, giving the so-called planetary movement to the beater and beater shaft. A spring metal ring or drip cup 113 is removably fastened to the side wall of ring gear 110, and has an inturned lower trough-like portion which serves to prevent dropping of lubricant from the gearing into the bowl below.

The bowl 16 is supported from an adjustable bowl support comprising two outwardly extending arms 120 which are fastened to a vertically adjustable yoke 121. Spaced guide rods 122 mounted at their lower ends in base 10 and at their upper ends in housing 13 serve to guide the yoke in its vertical movement. The adjusting mechanism for the bowl support comprises an extended rod 125 carried by the yoke member and extending within the interior of the pedestal through a slot 126 formed therein. Rod 125 is slidably received within a block 127 which in turn is provided with a hole into which fits a rotatable pin 128. The pin is mounted in a crank arm 129 and so arranged that in response to the turning of the crank arm about its axis, the block will be raised or lowered and, sliding along the rod 125, will cause the raising or the lowering of the bowl support and bowl supported thereby.

A handle 130 fastened to the crank arm projects through the pedestal and is conveniently placed so as to be made easily available to the operator. The shaft of the handle is journaled within an eccentric sleeve 131 provided with a circumferential groove 132 and a hexagonal end portion 133 adapted to be rotated by means of a suitable tool. A set screw 134 mounted in the body of the pedestal serves to hold the eccentric in any given position. When it is desired to change the range of movement of bowl and yoke, the set screw may be loosened and the eccentric then rotated to either raise or lower the handle and consequently the connected yoke and bowl. In this manner it suffices for the operator to turn the handle 130 a fixed and unchanging amount in every instance and in case greater clearance between bowl and beater is desired, this may be provided for through the action of the eccentric. It will be understood that when the lifting mechanism is in the raised position shown in Fig. 1, the crank arm 129 has passed across vertical dead center position, and the weight of the bowl and yoke acting downwardly with respect to the crank arm holds the parts in raised position. A spring pressed stop pin 135 is provided within the housing adjacent the uppermost limit of travel of the yoke and bowl to serve as a yieldable stop against which the yoke abuts in raised position to hold the parts against looseness on the frame and prevent rattle during operation of the mixer. The arms 120 are provided at their outer extremities with upstanding pins 139 adapted to receive openings in brackets 136 mounted on opposite sides of the bowl 16. A spring slip 137 carried by the slide or yoke 121 engages a projection 138 on the rear of the bowl to resiliently hold the bowl in the usual manner against tipping and against looseness and rattle on the bowl support.

One prevalent objection of machines as heretofore generally constructed for household use resides in the leakage of lubricant to a certain extent from the transmission casing along protruding shafts or other parts above the bowl and thence into the foodstuffs within the bowl. Where a simple rotary movement is imparted to the beater shaft, this may be minimized by the provision of a stuffing box through which the beater shaft extends, but only with the further objection of increasing the frictional resistance to rotation of the shaft and the power consumption of the machine. With a planetary beater shaft, additional problems arise, and these may be further added to where an attachment coupling is provided which opens out of the transmission casing adjacent to or above the planetary. The present invention provides a construction of machine which not only obviates this objection of lubricant leakage into the foodstuffs with a planetary type of gearing, but also enables the transmission casing to be at all times packed full of grease to provide adequate lubrication of the gearing or drive.

Figure 3:
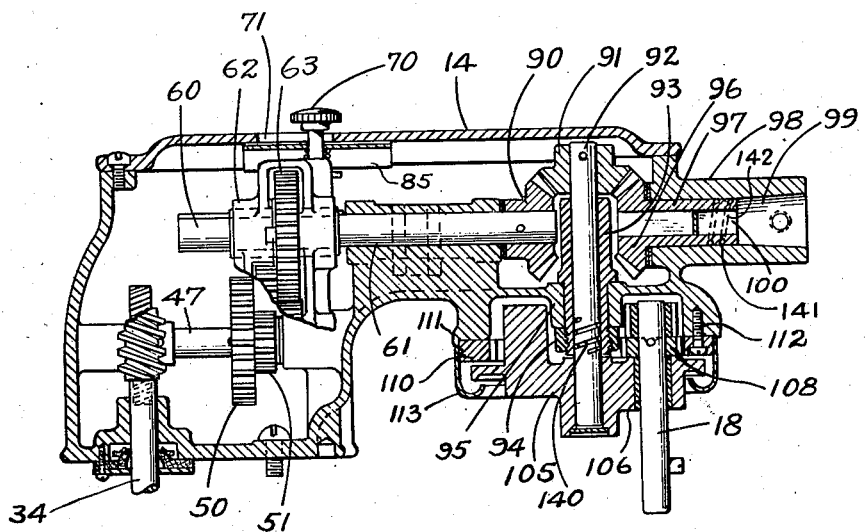
Fig. 3 is a partial vertical sectional view on the line 3—3 of Fig. 2.
Figure 4:
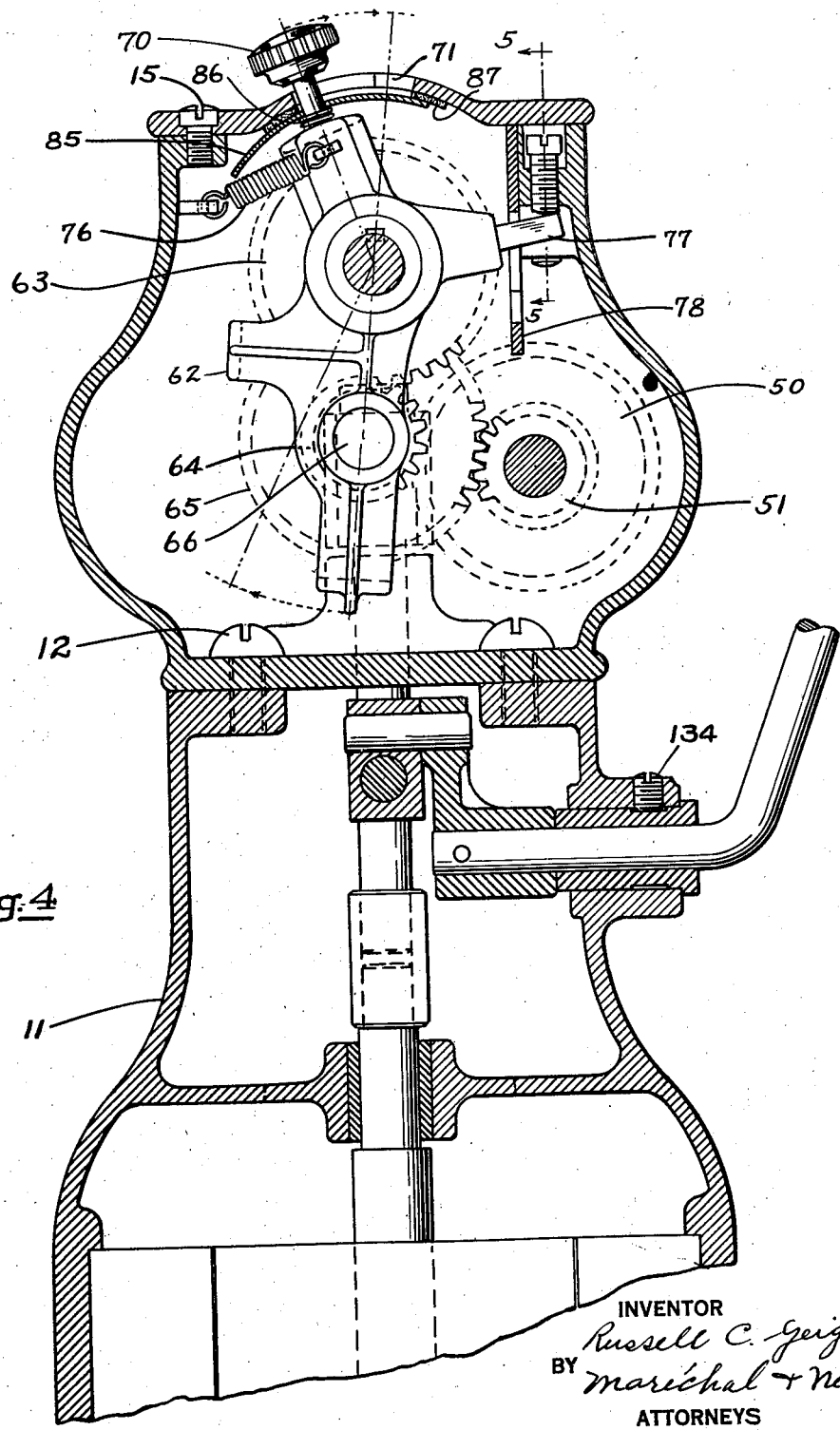
Fig. 4 is an enlarged vertical sectional view on the line 4—4 of Fig. 1.
Figure 5:
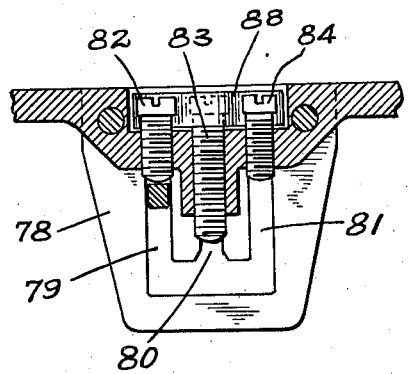
Fig. 5 is a sectional view of a detail of the transmission mechanism taken on the line 5—5 of Fig. 4.
Figure 8:
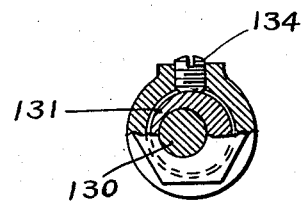
Fig. 8 is a detailed sectional view on the line 8—8 of Fig. 6.
Figure 6:
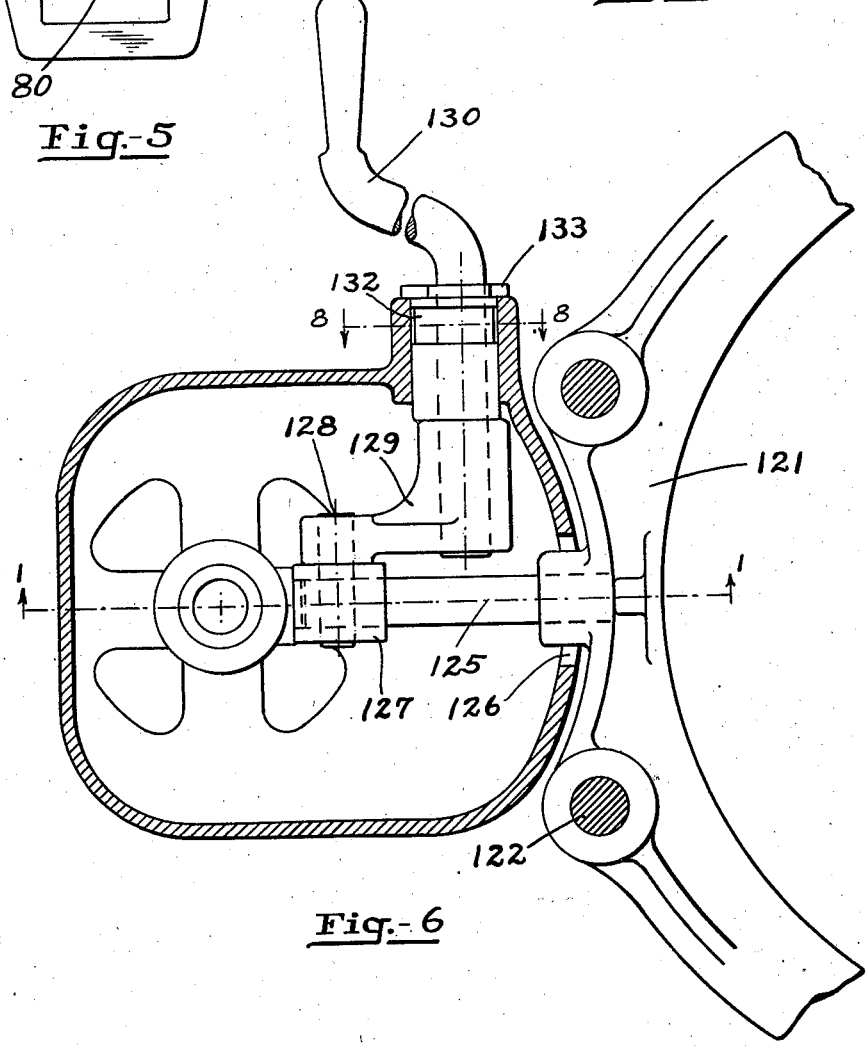
Fig. 6 is a horizontal sectional view on the line 6—6 of Fig. 1.
Figure 7:
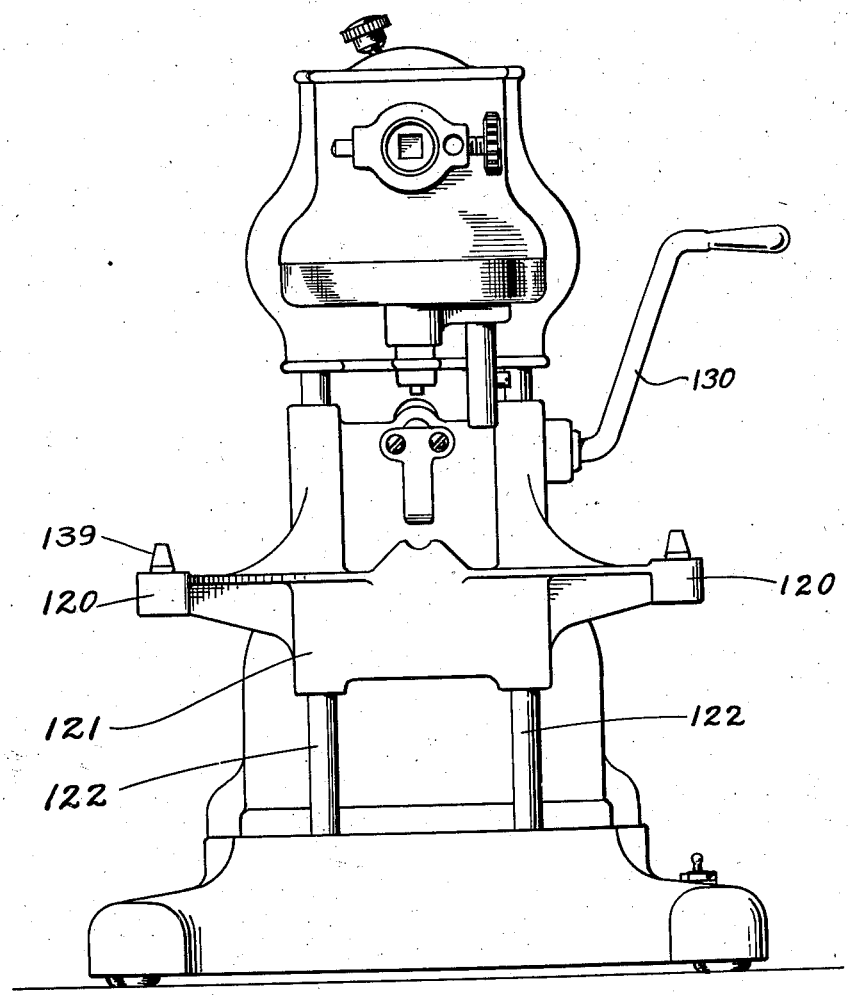
Fig. 7 is an end elevational view of the apparatus looking from the right hand of Fig. 1 with the bowl removed.

As shown more particularly in Fig. 3, the lower portion of the vertical shaft 92 supporting the planetary is provided opposite the lower end of bearing 93 with a reverse spiral groove 140 which is so coordinated with the direction of rotation of shaft 92 as to operate during the rotation of the shaft as a pump to force back lubricant tending to leak down between shaft 92 and bearing 93. This provides in effect a lubricant seal without increasing the frictional resistance to rotation of the parts. While it has been heretofore considered desirable to provide for lubricant seepage between such a shaft and its bearing, with resultant leakage of such substantial quantities of lubricant onto the planetary as to result in the accumulation of quantities of lubricant therein as will inevitably overflow into the foodstuffs with continued operation, I have found that the desired lubrication of the shaft and bearing can be obtained with this construction and at the same time substantially all leakage onto the planetary prevented. Should any slight leakage occur, this will be caught by the drip ring 113 which will suffice to hold any such leakage as may occur over long periods of operation without allowing any lubricant to get into the foodstuffs. As this ring 113 is readily removable for cleaning, the operator is thus enabled to easily avoid any leakage of lubricant into the foodstuffs with only infrequent cleaning, even though the machine is operated over extended periods of time. This is particularly important in connection with household machines of this character.

The attachment coupling shaft 97 is likewise provided with an exterior reverse spiral groove 141 positioned adjacent the squared end of this shaft and cooperating with the surrounding attachment hub 98 to force back any lubricant tending to seep along between the shaft 97 and hub 98. A coiled flexible spring 142 may be seated in this groove to further insure against lubricant getting beyond the end of shaft 97 when it is then enabled to pass out the flared end of hub 98. The spring 142 is of such size as to seat snugly within the groove of the shaft, and yet is spring pressed outwardly against the wall of the hub. A similar spring indicated at 143 may be provided in the groove 140. A food mixing machine is thus provided having a planetary beater shaft and an attachment coupling in which adequate lubrication of the relatively movable parts is effected, and which at the same time is provided with effective lubricant sealing means for the protruding parts including the planetary and attachment hub which prevent objectionable leakage of lubricant to the exterior thereof, while avoiding any undue frictional resistance to movement of the rotatable or movable parts.

The invention thus provides a food handling apparatus which is particularly suitable for modern household use where not only the feature of utility must be considered but also those of size, weight, ease of operation, and cost. The present apparatus is so designed and arranged that the operating parts are enclosed within a relatively small housing making the device extremely compact. At the same time, the mounting of the motor adjacent the base of the pedestal, utilizing the space within the pedestal for the motor parts and the pedestal itself as the housing for the motor parts, contributes to the compactness of the machine, while stabilizing the machine and lowering its center of gravity, this being of particular value in small size table machines of this character. It is further arranged so that access may be easily had both to the driving motor and to the change speed mechanism, thus rendering any repairs or inspection a simple matter. In addition to these very material advantages, the apparatus is also of great utility and is adapted to be used to drive a number of different attachments and for operating upon a number of different materials.

While the forms of apparatus herein described constitute a preferred embodiment of the invention, it is to be understood that the invention is not limited to this precise form of apparatus, and that changes may be made therein without departing from the scope of the invention which is defined in the appended claims.

What is claimed is:

1. In a food handling apparatus, the combination with a pedestal, a housing mounted on the pedestal, a bowl support adapted to receive a bowl, and a food treating shaft supported from the housing adapted to carry a stirring element, of a motor drive unit comprising a rotor and a stator mounted within the pedestal adjacent the lower portion thereof, the pedestal constituting the motor frame, the motor shaft being substantially vertical, a web formed integrally with said pedestal and positioned above and adjacent said motor, a bearing for the shaft of said rotor in said web, a driven shaft extending in driving relation from said rotor shaft into said housing, a bearing for said driven shaft positioned above said web and adjacent the lower portion of said housing, and means for operatively connecting the driven shaft with said food treating shaft.

2. A food handling apparatus comprising a base having an opening adjacent one end thereof, a pedestal mounted on said base overlying said opening, a housing mounted on the pedestal, a bowl support on the pedestal adapted to receive a bowl, a planetary shaft supported from the housing adapted to carry a stirring element, a motor drive unit having a substantially vertical motor axis removably positioned in the pedestal including rotor and stator parts adapted to be removed through said opening in the base, the said pedestal constituting the motor frame, and speed reducing and speed change gearing in the housing for operatively connecting said motor with said planetary shaft.

3. In a food handling apparatus, the combination with a base, a pedestal standing on said base, a housing mounted on top of said pedestal, a bowl support, and a planetary shaft supported in said housing and adapted to carry a stirring element, of a motor drive unit positioned within said pedestal adjacent the lower side thereof with its axis substantially vertical, a worm driven by said motor, a worm gear engaging said worm, a counter shaft rotated by said worm gear and carrying a plurality of driving gears, change speed mechanism adapted to have variable engagement with said driving gears, a main shaft driven through said mechanism, and interconnections between said main shaft and said planetary shaft, said motor driven worm and said change speed mechanism being located within said housing.

4. A food handling apparatus comprising a pedestal having a lower portion of larger diameter and an upper portion of smaller diameter separated by a transversely extending web, a housing mounted on top of said pedestal, a bowl support adapted to receive a bowl, a food treating shaft supported from said housing adapted to carry a stirring element, a motor drive unit within said lower portion of the pedestal, means for removably retaining said unit in operative position in said pedestal and providing for the downward vertical removal of the motor therefrom, a motor shaft extending upwardly through and journalled in said web, a driven shaft in axial alignment with said motor shaft, a separable connection between said motor shaft and said driven shaft to provide for driving of the latter, said driven shaft extending upwardly and being journalled in said housing, and operative connections within said housing between said driven shaft and said food treating shaft providing for the driving of said food treating shaft.

5. A food handling apparatus of the character described comprising a base provided with an opening therein adjacent one end, a hollow pedestal positioned on said base over said opening, said pedestal having an integrally formed transversely extending web positioned intermediate the ends thereof, said web dividing the pedestal into an upper and a lower compartment, a motor positioned in the lower compartment, the pedestal constituting the motor frame and the motor extending over said opening, with its axis substantially vertical, an end cap lying within the opening in said base and containing a lower bearing for the motor shaft, means for detachably connecting said end cap directly to the pedestal to provide for removal of the cap and the motor through the opening in said base, a bearing positioned in said web forming an upper bearing for the motor shaft, said shaft extending into said upper compartment, a food treating shaft and driving connections between said motor shaft and said food treating shaft providing for operation of said food treating shaft.

6. A food handling device of the character described adapted to perform beating, mixing, and stirring operations and the like, comprising a base having an opening therethrough, a pedestal positioned at one end of the base over said opening, a housing supported entirely by said pedestal in overhanging relation with respect to the base, a bowl support adapted to receive a bowl, a planetary shaft mounted in said housing and adapted to carry a stirring element, a motor drive unit positioned within and removable from said pedestal through said opening in the base with the pedestal constituting the motor frame, the motor having its axis substantially vertical, and driving connections between said motor and said planetary shaft.

7. A food handling device of the character described adapted to perform beating, mixing, and stirring operations and the like, comprising a base having an opening adjacent one end thereof, a pedestal positioned on said base over said opening, a housing supported entirely on said pedestal in overhanging relation with respect to said base, a bowl support adapted to receive a bowl, a planetary shaft supported from the housing adapted to carry a stirring element, a motor drive unit having a rotor and a stator with its axis substantially vertical, an end cap for said motor within said base providing a bearing for the motor shaft, said end cap and the rotor of said motor being removable through said opening in the base while maintaining the operative assembly of said planetary shaft and said bowl support.

8. A food handling device of the character described for performing beating, mixing, and stirring operations and the like, comprising a base having an opening adjacent one end thereof, a pedestal having an open end, and supported over the opening in said base, a housing mounted on and supported solely by said pedestal in overhanging relation with respect to the base, power take-off attachment coupling means located on said overhanging portion of said housing above the base, a food treating shaft also supported from said housing, motor drive means located in said pedestal and removable through said open end and through said opening in the base, said drive means being located substantially below said overhanging housing to provide a low center of gravity, and means forming a driving connection from said motor drive means through said pedestal to said power take-off means and said food treating shaft.

RUSSELL C. GEIGER.

CERTIFICATE OF CORRECTION.

Patent No. 2,024,282.                                December 17, 1935.

RUSSELL C. GEIGER.

It is hereby certified that the name of the assignee in the above numbered patent was erroneously written and printed as "The Kitchen Aid Manufacturing Company" whereas said name should have been written and printed as The KitchenAid Manufacturing Company, of Troy, Ohio, a corporation of Ohio, as shown by the records of assignments in this office; page 3, first column, line 69, for "slip" read clip; and that the said Letters Patent should be read with these corrections therein that the same may conform to the record of the case in the Patent Office.

Signed and sealed this 25th day of February, A. D. 1936.

Leslie Frazer (Seal.)                                Acting Commissioner of Patents.